United States Patent [19]

Noel

[11] 4,198,363
[45] Apr. 15, 1980

[54] CONTINUOUS EXTRUSION OF THERMOPLASTIC MATERIALS

[75] Inventor: Gerard Noel, Eupen, Belgium

[73] Assignee: Noel, Marquet & Cie, S.A., Eupen, Belgium

[21] Appl. No.: 873,895

[22] Filed: Jan. 31, 1978

Related U.S. Application Data

[62] Division of Ser. No. 658,462, Feb. 17, 1976, Pat. No. 4,087,222.

[30] Foreign Application Priority Data

Feb. 25, 1975 [DE] Fed. Rep. of Germany ....... 2507979

[51] Int. Cl.² ............................................. B29F 3/04
[52] U.S. Cl. ................................... 264/45.9; 264/50; 264/51; 264/53; 264/54; 264/173; 264/209
[58] Field of Search .................... 264/95, 48, 51, 173, 264/53, 171, 176 R, 177 R, 45.9, 46.1, 45.5, 50, 54, 209; 425/97, 107, 817 C, 376 A

[56] References Cited

U.S. PATENT DOCUMENTS

| | | | |
|---|---|---|---|
| 2,537,977 | 1/1951 | Dulmage | 425/97 |
| 2,597,553 | 5/1952 | Weber | 425/97 |
| 2,616,126 | 11/1952 | Merck et al. | 425/97 |
| 2,649,618 | 8/1953 | Rhodes et al. | 425/97 |
| 2,688,153 | 9/1954 | Gebauer et al. | 425/97 |
| 3,229,005 | 1/1966 | Reifenhauser | 264/171 |
| 3,256,560 | 6/1966 | Adomaitus | 264/108 |
| 3,270,371 | 9/1966 | Schiedrum et al. | 425/467 |
| 3,535,409 | 10/1970 | Rohde | 425/133.5 |
| 3,538,201 | 11/1970 | Eberle et al. | 264/45.9 |
| 3,549,735 | 12/1970 | Moss | 264/98 |
| 3,659,987 | 5/1972 | Mixell et al. | 264/347 |
| 3,764,642 | 10/1973 | Boutillier | 264/48 |
| 3,879,505 | 4/1975 | Boutillier et al. | 264/48 |

FOREIGN PATENT DOCUMENTS 1154264 9/1963 Fed. Rep. of Germany .
1729076 10/1973 Fed. Rep. of Germany .

Primary Examiner—Jeffery R. Thurlow
Attorney, Agent, or Firm—Larson, Taylor and Hinds

[57] ABSTRACT

This invention relates to a method of continuously extruding thermoplastic material with a solid, hollow or open cross-section, in which a liquid medium is continuously applied to the surface of the material being extruded before it leaves a nozzle which shapes the cross-section of the extruded material to the desired profile, and the surface of the material being extruded is also roughened, either before, simultaneously with or immediately after the application of the liquid medium, but before the material leaves the nozzle.

9 Claims, 5 Drawing Figures

CONTINUOUS EXTRUSION OF THERMOPLASTIC MATERIALS

This is a division of application Ser. No. 658,462 filed Feb. 17, 1976 now U.S. Pat. No. 4,087,222 issued June 2, 1978.

This invention relates to a method of continuously extruding a thermoplastic material with a solid, hollow or open cross-section, particularly cross-sections with a sharp edged profile, and to an extrusion die for use in the method.

The extrusion of non-foamable thermoplastic materials to give products with a wide variety of cross sectional profiles has been carried out for a long time. It has also been known for a long time to facilitate the movement of the thermo-plastic material through the profiling die of the extrusion machine by introducing a lubricant between the material being extruded and the highly polished walls of the die. The lubricant spreads over the surface or surfaces of the strand being extruded, forming a film.

It is also known to form by extrusion continuous strands of foamed thermoplastic materials having solid, hollow or open cross-sectional profiles. A process is also known for manufacturing continuous profiled strands which have a foamed core enclosed in a jacket which has a smooth surface. In this process two substances are extruded simultaneously, one being foamable thermoplastic material to form the core, and the other being a non-foamable thermoplastic material to form the jacket (see German Pat. No. 1 154 264). In this way there is obtained a strand of foamed plastics material enclosed in a hard, smooth outer skin. However, the equipment required for carrying out this process is comparatively complex and expansive, and adhesion between the core and the jacket is not always satisfactory.

A process is also known for the manufacture of a continuous strand of foamed thermoplastic material having a uniform cell structure and a smooth outer surface in which the foamable plastics material is extruded through a die containing an internal mandrel pin directly into a cooled calibrating device which has the same cross section as the outlet from the die. The product therefore has the same cross sectional outer shape and size as the calibrating device (see German Auslegeschrift No. 1 729 076). What happens in this process is that, as soon as the foamable material leaves the die outlet, it comes into contact with the cooled calibrating device, the temperature of which is below the stiffening temperature of the foamable plastics material, and a hard layer forms on the surface of the extruded strand. After this, the material is compelled to foam inwardly. With this process, solid, or hollow cross-sectional profiled continuous strands can be extruded using foamable thermoplastics materials, the nature of the product depending on the extrusion conditions, which includes the pull-away speed (i.e. the speed at which the product is pulled away from the extrusion die). A disadvantage of this process is that, when products are being made which have a relatively low bulk density, it is difficult to propel or pull the foaming extruded strand through the calibrating device. A further, and even more serious, disadvantage is that only low pull-away speeds can be used, usually of the order of 20 to 30 cm/minute, and at most 75 cm/minute.

According to the present invention, in a method of continuously extruding thermoplastic material with a solid, hollow or open cross-section, a liquid medium is continuously applied to the surface of the material being extruded before it leaves a nozzle which shapes the cross-section of the extruded material to the desired profile, and the surface of the material being extruded is also roughened, either before, simultaneously with or immediately after the application of the liquid medium, but before the material leaves the nozzle. The roughening of the surface of the material being extruded has the effect that the liquid medium penetrates at least partly through the surface of the material, changing the properties of this surface in a desired manner.

The method in accordance with the present invention makes it possible, by simple means, to influence the surface characteristics of continuous extruded strands of foamed or non-foamed thermoplastics material, not only by forming a smooth outer skin but also in other ways such as giving the surface a desired colour. More important, however, the present invention makes it possible to extrude foamable thermoplastics material using pull-away speeds of at least 5 m/minute, the product simultaneously being given a smooth outer skin. The method in accordance with the invention is particularly suitable for extruding products which have complex profiles and which have bulk densities lower than 0.15, preferably lower than 0.1. Also, if an extrusion nozzle is used having an internal mandrel pin to produce an extruded strand having a hollow cross-section, the method can be arranged so that the extruded strand can be subdivided into several separate products simply by tearing the strand apart longitudinally.

In accordance with a further aspect of the invention, an extrusion die for use in carrying out the method comprises a nozzle through which the material is extruded to provide it with a desired cross-sectional profile, a tubular nozzle holder having a passage through which the material passes to the nozzle and which has a roughened surface upstream of the nozzle, and feed ducts through which a liquid medium can be applied to the surface of the material passing through the die upstream of the nozzle.

For producing hollow cross-sectioned extruded strands, the extrusion nozzle is provided with an internal mandrel pin supported in position by pin holding means. The tubular nozzle holder, of which its internal passage is arranged coaxially with the nozzle, may be provided with heating devices, and temperature and pressure sensors for assisting the carrying out of the method in accordance with the invention.

The feed ducts through which the liquid medium is applied to the surface of the material being extruded may be located in the nozzle holder and/or the nozzle. Also, feed ducts may be located in the mandrel pin and/or the pin holding means when the nozzle is provided with these.

The liquid medium used in the method should be a substance which is fluid or pasty at the temperatures and pressures prevailing in the nozzle holder during the method, and which preferably has a low viscosity under these conditions. In general the liquid media preferred are fluid, highly viscous, waxy or solid at room temperature (excluding thermoplastic synthetic substances), and are fluid or pasty at the temperatures and pressures prevailing in the nozzle holder and nozzle during the method. Usually, the boiling point of the liquid medium is higher than the temperature of the plastic mass being extruded, that is to say higher than the temperatures in the nozzle holder and nozzle, although under certain special conditions it is possible to use a liquid which has a lower boiling point than this. As an example, in the extrusion of profiled sections from foamable thermoplastic materials, a matt-finished surface skin may be produced by using as the liquid medium a liquid which has a comparatively low viscosity at room temperature and has a boiling point of at least 140° C., preferably over 200° C. Substances which are soluble in water are particularly useful as liquid media, for example, water-soluble silicon oils of the kind used in polyurethane chemistry as foam stabilizers.

The liquid medium used in accordance with the invention serves either to solve a special problem or simultaneously to solve several problems, in which case additives may be carried by the liquid medium which are already known in existing extrusion techniques. Therefore, they need not be described here, but as one example, the liquid medium may carry a dye for colouring the surface of the product, in which case the medium should be capable of acting as a solvent for the particular dye.

The quantity of liquid medium to use depends on its intended function. In practice, it has been found that the quantity to use must be determined experimentally in each particular case. To produce a smooth skin on a foamed extruded product there may be used, depending on the circumstances, between 3 and 12 g/m$^2$ of a liquid medium, preferably between 6 and 8 g/m$^2$, based on the external surface area of the product. In many cases a considerable portion of the liquid medium will be allowed to remain on the surface of the product, as such an excess is often desired for practical reasons. On the other hand, an undesired excess of the liquid medium can easily be removed from the surface of the product, at least in the case of a water-soluble substance, by applying a spray of water.

The liquid medium is introduced under a pressure which is directly proportional to the quantity it is intended to use. In general, the pressure of injection is 10 to 30% higher than the pressure at the inner surface of the nozzle holder or nozzle due to the material being extruded.

The temperature of the liquid medium when it is being injected is usually nearly the same as the temperature of the plastic mass in the extruder, the temperature of the liquid medium being raised by the warm walls of the feed ducts through which it flows. If a liquid medium is used which is highly viscous, waxy or even solid at room temperature, it must of course be heated enough before being injected through the feed ducts to ensure that it is sufficiently fluid. In certain cases, however, the liquid medium may be used for cooling the surface of the product. In this case the liquid medium may be injected at room temperature or below and it must have a low viscosity. The cooled liquid medium can be injected through a thermally insulated intermediate part which contains the necessary bores or an annular nozzle.

The liquid medium is preferably introduced into contact with the surface of the thermoplastic material in the nozzle holder at several opposite locations, preferably through very small diameter bores and/or an annular groove extending around the surface of the passage in the nozzle holder and into which the feed ducts open.

Liquid media suitable for use in the method in accordance with the present invention include mineral oils and fats, plant and animal oils and fats, sulfonated mineral oils and fats, sulfonated plant and animal oils and fats, silicone oils, particularly water-soluble silicone oils, liquid soaps, triethanolamine, low-molecular polyesters and polyethers, waxes, glycerin, liquid prepolymers of the thermoplastic material being extruded, and organic and inorganic solvents in which the thermoplastic material is soluble or insoluble, depending on the nature of the problem tackled. Also, under certain circumstances, polymerisable reaction mixtures which take a long time to set can be used as the liquid medium. These substances polymerize after the product has left the nozzle, producing a smooth outer surface.

Examples of the method and of the extrusion die in accordance with the invention will now be described with reference to the accompanying drawings, in which.

Figure 1:
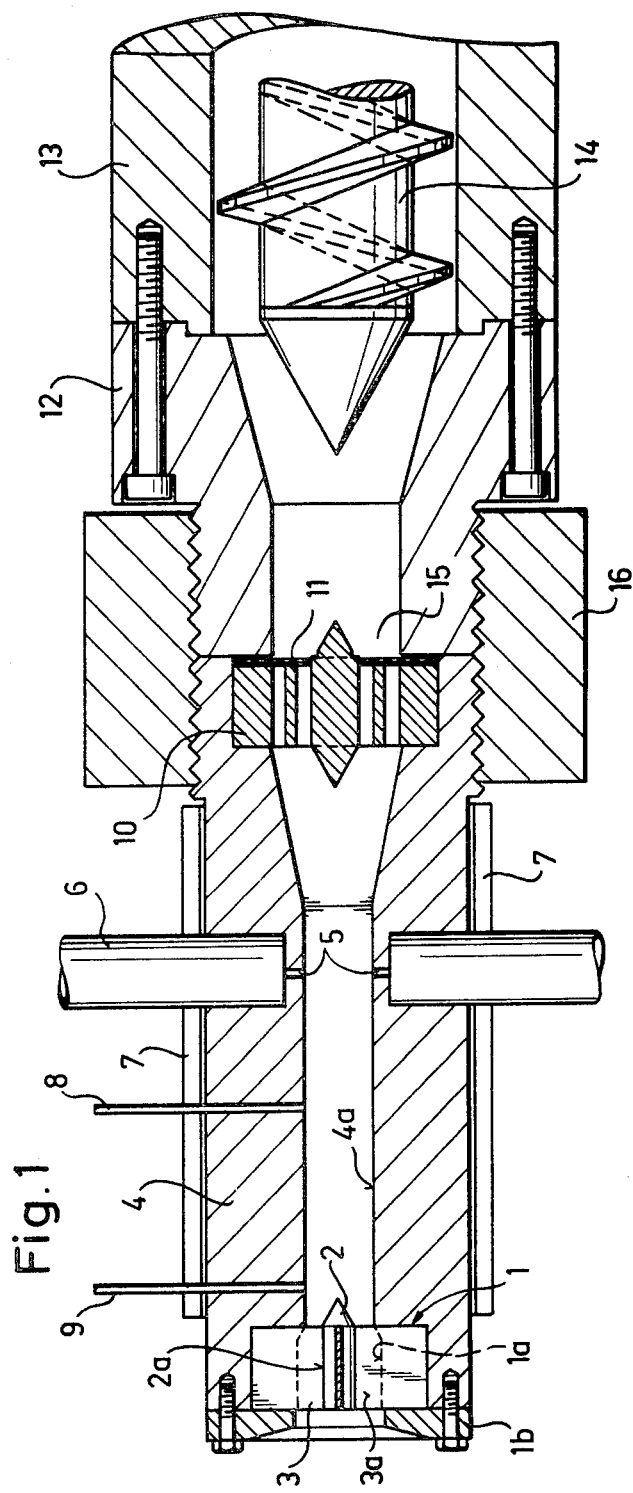
FIG. 1 is a diagrammatic longitudinal section through one form of extrusion die mounted on the end of an extruder.

The extrusion die shown in FIG. 1 is mounted on the downstream end of a conventional extruder, of which the drawing shows only the end-piece 12 and the jacket 13 containing the extruder worm 14. The internal passage in the end-piece 12 at first decreases in diameter conically, in the downstream direction, and is then cylindrical as far as the outlet 15, which is followed by a screen 11 backed by a perforated plate 10. The die is attached to the downstream end of the end-piece 12, and comprises a nozzle holder 4 supporting, at its downstream end, a profiled nozzle 1. Penetrating radially inwards through the wall of the nozzle holder 4 there are feed ducts 5 through which, in use, a liquid medium is fed in from injection channels 6. The nozzle holder 4 and, if desired, also the nozzle 1, is equipped with a heater 7, a temperature sensor 8 and a pressure sensor 9. In this example the profiled nozzle 1 contains an internal mandrel pin 2 supported by four mandrel pin holders 3 in the form of thin bridges spaced at 90° intervals around the circumference.

When the apparatus is in operation, a foamable plastic mixture, which may for example consist of polystyrene, a foaming agent and conventional additives, is propelled by the worm 14 through the end-piece 12 and out through the screen 11 and the perforated plate 10 into the internal passage of the tubular nozzle holder 4. During its passage through the nozzle holder 4 the foamable plastic mixture is given a surface treatment by injecting a liquid medium through the feed ducts 5.

The length of the nozzle holder 4 depends on the pullaway speed, that is to say the speed at which the extruded product is pulled away from the nozzle 1, on the desired distribution of the liquid medium over the surface of the product and on other extrusion conditions. From the nozzle holder 4 the foamable plastic mixture is forced through the profiled nozzle 1, and it should be noted that the extrusion conditions are selected so that the mixture does not foam during its passage through the nozzle holder 4, does not foam or foams only slightly on its way through the profiled nozzle 1, and only begins to foam properly when it leaves the outlet of the nozzle 1. Consequently, as soon as it leaves the profiled nozzle 1, the plastic mixture, the cross section of which at this instant is determined by the profile of the nozzle, begins to foam in the open air and a smooth outer skin 17 is formed, as represented for example in FIG. 5. The plastic mixture foams both outwards and inwards, the increase in the volume of the foam depending on a number of factors which must, in practice, be determined experimentally, particularly in the case of complex profiles. In the manufacture of foamed plastic profiled extrusions which are foamed freely in the air, it is a known guiding rule that the dimensions of the nozzle 1 should be about ⅓ of the dimensions of the desired profiled product, assuming optimum extrusion conditions (composition of the foamable plastic mixture, temperatures, pressures, pull-away speed and the like). If desired, a product made by a method in accordance with the invention can be given sharper contours by controlling the foaming of the plastic material using a calibrating device of progressively increasing internal cross section, preferably made of a highly polished chrome steel, downstream of the nozzle 1. The foaming angle, or the effective length of the calibrating device, is determined essentially by the degree of difficulty of manufacture, by the desired sharpness of the resulting edges and by the volume of the profile, particularly in the case of ornamental beadings or covings. Further advantages may be obtained by passing the foamed product between rollers or the like in a known manner. This is usually done while the extruded product is still warm and deformable. The product is pulled away be means of traction chains, as is also known, and finally the extruded profiled strand is cut into lengths with a saw.

Figure 2:
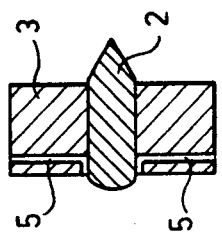
FIG. 2 is a diagrammatic longitudinal section through an alternative form of mandrel pin and its holders for use in the nozzle of the die shown in FIG. 1.

In the manufacture of profiled extrusions having a hollow cross section, it is sometimes desired to give the internal surface of the product a smooth skin. In this case, the internal mandrel pin 2, which may also have a roughened surface, preferably has internal feed ducts (not shown) which communicate through the bridge-like mandrel pin holders 3 and the nozzle holder 4 with the injection channels 6. In another version of the mandrel 2 as shown in FIG. 2, feed ducts 3a are provided only in the mandrel pin holders 3.

Figure 3:
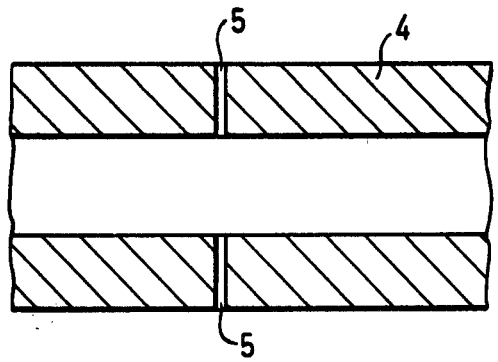
FIG. 3 is a diagrammatic longitudinal section through a portion of the nozzle holder of the die of FIG. 1, showing the arrangement of the feed ducts for the liquid medium.
Figure 4:
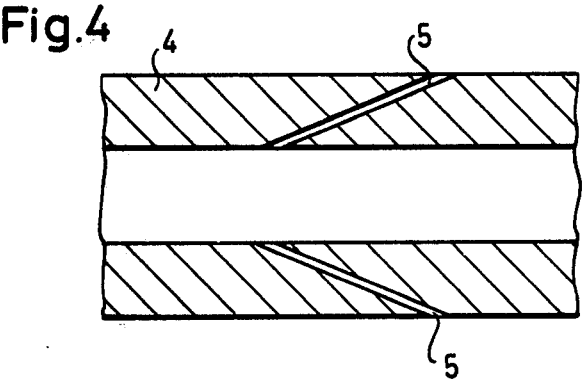
FIG. 4 is a view similar to FIG. 3, but showing an alternative arrangement for the feed ducts; and, FIG. 5 is a diagrammatic cross section through a product having a comparatively complex hollow profile extruded by a method in accordance with the invention.

Although the feed ducts 5 will usually only be in the nozzle holder 4, similar feed ducts may be provided through the walls of the nozzle 1, either as well as or instead of the ducts 5 in the walls of the nozzle holder 4. The feed ducts 5 are preferably in the form of several bores of very small diameter, wherever they are located be it through the walls of the nozzle holder 4, the walls of the nozzle 1, the mandrel pin holders 3, or the mandrel 2 itself. If desired, the feed ducts 5 may open into an annular groove in the inner surface 4a of the nozzle holder 4, the inner surface 1a of the nozzle 1, and/or the outer surface 2a of the mandrel pin 2, in which case there need only be one feed duct 5. Preferably however, there are feed ducts 5 only in the walls of the nozzle holder 4, the feed ducts penetrating radially through the wall in the same cross sectional plane as each other, as represented in FIGS. 1 and 3, although in some cases it may be preferred to make the feed ducts 5 penetrate at an angle through the walls of the nozzle holder 4, as represented in FIG. 4.

The tubular nozzle holder 4 is preferably replaceable and its internal passage may have any desired cross sectional shape, although this is preferably circular. The internal passage will therefore usually be cylindrical, but it may expand somewhat conically in the direction of the nozzle 1.

Particularly good results are obtained in the roughening of the inner passage of the nozzle holder 4 is provided by very fine annular ridges or helical rifling, preferably extending over the entire inner surface 4a. In certain cases however, it is advantageous to roughen the inner surface of the nozzle holder 4 only in the region between the nozzle 1 and the feed ducts 5, these ducts 5 preferably being in the upstream half of the nozzle holder 4.

The length of the nozzle holder 4 depends on the particular method in operation, but in general the nozzle holder 4 should have a length at least 3 times, preferably at least 8 times, its internal diameter.

The method in accordance with the invention is applicable to all the known processes for extruding solid, hollow or open cross-sections from either foamable or non-foamable thermoplastic materials. When using foamable plastics, either chemical or physical (direct gas or vapour injection) foaming agents can be used, or a combination of the two. Direct gas injection is of economic interest only in the manufacture of products with bulk densities of 100 km/m$^3$ or less. Such low bulk densitites have not hitherto been practicable using chemical foaming agents. Direct gas injection is used in a particularly useful application of the present invention, i.e. in the manufacture of very light ornamental profiles made of foamed polystyrene.

Thermoplastic materials which may be used in the method are polymers or copolymers of vinyl or vinylidene monomers such as ethylene, propylene, butadiene, styrene, vinyltoluene, alphamethylstyrene, acrylonitrile, vinyl chloride, vinyl acetate, methyl acrylate, methyl methacrylate, or ethyl acrylate. Particularly preferred are polyvinylaromatic plastics, that is to say polymers or copolymers of vinylaromatic monomers such as styrene, chlorostyrene, vinyltoluene or alpha-methylstyrene. The copolymers may be made from vinylaromatic monomers together with a different olefinic monomer such as acrylonitrile, vinyl chloride, vinyl acetate, methyl acrylate, methylmethacrylate or ethyl acrylate. Toughened polystyrenes may also be used in the method in accordance with the invention. Excellent results are obtained using polystyrene. Among other synthetic materials which may be used in the method are polyamides and the like.

When foamable thermoplastic material is used, the foaming agent added to the basic thermoplastic material may be a chemical substance which decomposes at certain temperatures with the formation of gases, or it may be a volatile substance which is a gas or vapour at normal temperatures and pressures (20° C., 1 atm), but which dissolves in the molten or semi-molten thermoplastic material at the temperatures and pressures existing in the extruder. Among the volatile substances which may be used are low-molecular aliphatic hydrocarbons such as ethane, ehtylene, propane, propylene, isobutene, butandiene, butane, isoprotene, or pentane, low-molecular alkylhalogenides such as methyl chloride, dichlorodifluoromethane, trichloromethane, 1,2-dichlorotetrafluoroethane, and inorganic gases such as carbon dioxide or nitrogen. Preferred are the low-molecular aliphatic hydrocarbons, particularly butane, isobutene and the frigenes, that is to say monofluorotrichloromethane, difluorodichloromethane, trifluoromonochloromethane, monofluorodichloromethane, difluoromonochloromethane, 1,2,2-trifluorotrichloroethane, 1,1,2,2-tetrafluorodichloroethane, octafluorocyclobutane, trifluorobromomethane and mixtures of these substances.

The foaming agent is usually used in concentrations of 3 to 50%, preferably 7 to 30%, based on the weight of the thermoplastic material, the concentration used depending of course on the bulk density desired for the foamed product. If direct injection of gas or vapour is used, the substance is continuously sprayed into the molten plastic in the extruder. Another method for producing foam is to add a previously prepared composition which already contains a foaming agent.

If it is desired to produce a particularly fine cell structure in the foamed extruded product, it is advisable to add to the material to be extruded substances which form nuclei. A number of compounds are suitable for this purpose, for example finely divided inert solids such as silicon dioxide or aluminium dioxide, if necessary together with zinc stearate or small quantities of a substance which decomposes at the extrusion temperature with the formation of gas, for example sodium carbonate, if desired together with acetic or citric acid. The substance is added in a concentration up to 5%, based on the weight of the thermoplastic material, so that an intimate mixture is formed. The nuclei-forming substances which may be used are well known in the art and need not be described in any further detail.

On the other hand, the foaming agent may, as already mentioned, be a chemical foaming agent, for example a bicarbonate such as sodium bicarbonate or ammonium carbonate. Other examples are ammonium nitrite, or an organic nitrogen compound which releases nitrogen on heating, for example dinitrosopentamethylendiamine, barium-azodicarboxylate, azodicarbonamide, substituted thiatriazole, diphenylsulfone-3,3'-disulfonehydrazide or azoisobuteric acid dinitride.

The extrusion temperature (that is to say the temperature of the extruder and the thermoplastic material in the extruder) depends to a certain extent on the softening point of the plastic material to be extruded. Usually temperatures of 95° to 190° C. are used, more often 100° to 160° C. For example, in extruding foamable polystyrene the temperature is betweeen 130° and 160° C. Polyethylene requires a rather lower temperature, between 95° and 110° C.

The pressure in the extruder is usually sufficient to prevent the plastic mixture from beginning to foam before leaving the extrusion die. If the foaming agent is a condensible, volatile substance the pressure should be greater than the saturated vapour pressure of the volatile substance at the extrusion temperature. Quite high pressures, for example between 17 and 105 kg/cm$^2$, may be used. The pressure is preferably between 21 and 70 kg/cm$^2$.

The following are only a few examples of the many in accordance with the invention which may be used to produce foamed extruded products having a profiled smooth outer skin.

EXAMPLE 1

This example describes the manufacture of a solid cross-section foamed polystyrene rod with a smooth silky-mat surface. The rod has a homogeneous surface skin approximately 0.3 mm thick, and a bulk density of 0.11 (110 kg/m$^3$).

The polystyrol for extruding and foaming is mixed for about 3 minutes in a rapidly rotating mixer with, by weight, 0.95% of citric acid, and 1.2% of sodium bicarbonate. The mixture is then introduced in the usual way into a double worm extruder and heated to 190° C., to make the mixture plastic. Into the plastic mass there is then injected continuously at the point where the pressure has almost reached its highest value 7% of isopentane, with sustained mixing and kneading. The resulting foamable plastic mixture is then driven through the nozzle holder 4 and the nozzle 1 of an extrusion die similar to that of FIG. 1 but without any mandrel pin, so that extrusion takes place. The mixture is cooled stepwise down to 120° C. in the extrusion die, and during the extrusion a water-soluble silicon oil is injected through the feed ducts 5 in the nozzle holder 4. The extruded polystyrene strand foams homogeneously in the air. The product is conveyed by a pull-away device, and with the help of supplementary rollers, through a cooling bath. The pull-away speed is 5.5 m/min. and the cooled strip is subsequently cut to desired lengths by a sawing device.

Rods of other bulk densities may be made in the same way without changing the original mixture, for example by changing the pull-away speed, the size of the extrusion nozzle, and the spacing between the rollers.

EXAMPLE 2

Figure 5:
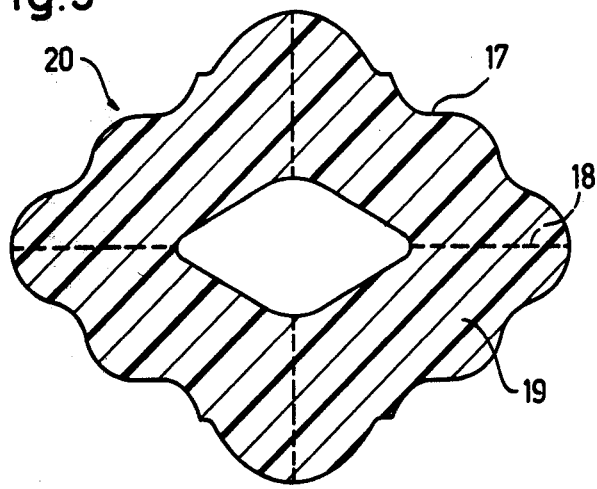

This example describes the continuous manufacture of a very low bulk density strand having a hollow profiled crosssection, such as of the kind represented at 20 in FIG. 5. The foamed material is polystyrene and the bulk density of the product is 0.06 (60 kg/m$^3$). The product has a smooth outer skin 17, a foam layer 19 and separation planes of weakness 18.

The procedure is as for Example 1, but modified in that instead of isopentane there is used frigen, and instead of the pinless mandrel one uses an internal mandrel pin supported by four mandrel pin holders angularly spaced at 90° as in FIG. 1. Furthermore, when the extruded product emerges from the nozzle 1 into the air its temperature is only about 100° C. A silicon oil is injected continuously through the feed ducts 5 in the nozzle holder 4, at a rate of 6 g/m$^2$ of outer surface of the hollow profile, and as soon as the product emerges from the nozzle it already has a semi-matt surface skin. The injected silicon oil fulfils two requirements. It not only forms the smooth outer skin on the product but also, being injected at a sufficiently rapid rate, distributes itself over the surfaces of the mandrel pin holder by which the flowing plastic mass is subdivided into four strips. The silicone oil on the surfaces of the holder prevents the four strips from subsequently adhering firmly together on passing through the nozzle, and hence the separation planes 18 are formed. The finished product is easy to tear apart to form four separate strips, without damage and without this requiring the use of a special tool. These strips are used as ornamental ceiling covings.

EXAMPLE 3

Example 1 is repeated, with the modification that the polystyrene is mixed with 1.5% of magnesium silicate and 2.5% by weight of kieselgur. Both these substances have previously been ground very fine and roasted. Foaming is produced by 17% of ethyl chloride. The plastic mass is extruded into the air at a temperature of 134° C. The product, which is sawn into lengths as desired, is a profiled plastic moulding with a smooth, hard and continuous outer skin, and a bulk density of 0.39 (390 kg/m$^3$).

EXAMPLE 4

Example 1 is repeated, but with the modification that polyethylene is used instead of polystyrene. The material is extruded into the air at 80° C. The product is profiled with a smooth outer skin and a bulk density of 0.21 (210 kg/m$^3$).

What we claim is:

1. A method of continuously extruding an extrudable thermoplastic material having a solid, hollow or open cross-section through a shaping nozzle, the method comprising:
    continuously extruding the thermoplastic material through a shaping nozzle that shapes the cross-section thereof to the desired profile;
    continuously applying a liquid medium to the surface of the thermoplastic material being extruded prior to the thermoplastic material's entering the shaping nozzle; and
    roughening the surface of the thermoplastic material being extruded after applying the liquid medium but prior to the extruded material's entering said shaping nozzle.

2. A method according to claim 1 wherein said thermoplastic material is foamable, said method further comprising:
    shaping said material to the desired cross-section profile with said nozzle; and
    foaming said material in free air subsequent to leaving said nozzle.

3. A method according to claim 1 wherein said method comprises:
    continuously extruding said thermoplastic material into an elongate tubular nozzle holder having a wall defining an internal passage;
    applying said liquid medium through feed duct openings into said nozzle holder passage to the surface of said material being extruded;
    roughening the surface of said material being extruded by forcing said material into contact with said nozzle holder wall, said wall having a roughened portion downstream of said feed duct openings;
    discharging said material being extruded through a shaping nozzle located at the donwstream end of said nozzle holder.

4. A method according to claim 3 wherein said nozzle has an internal mandrel pin supported in position by pin holding means, said method further comprising forming a hollow extruded material by forcing said material around said mandrel.

5. A method according to claim 4 and further including:
    continuously applying a liquid medium to the interior surface defining the hollow portion of said material being extruded by forcing said liquid medium through feed ducts penetrating through the outer surface of said mandrel pin; and
    roughening said interior surface of said material being extruded.

6. A method according to claim 5 wherein said mandrel pin has a roughened outer surface which roughens said interior surface of said material being extruded.

7. A method according to claim 1 wherein said liquid medium comprises a water-soluble silicon oil.

8. A method according to claim 1 and further comprising pulling away said material extruded through said nozzle at speeds of at least 5 meters per minute.

9. A method according to claim 4 wherein said method further comprises
    applying said liquid medium to the surfaces of said pin holding means; and
    subdividing said material into a plurality of strips by forcing said material into contact with said pin holding means and by penetrating the surfaces defining said subdivided strips with said liquid medium so as to prevent said strips adhering to one another.

* * * * *